(12) United States Patent
Van De Loo

(10) Patent No.: US 6,430,457 B1
(45) Date of Patent: Aug. 6, 2002

(54) METHOD AND SYSTEM FOR MAKING UP AND MANAGING A LOGISTIC CHAIN

(75) Inventor: Eduard Jan Alfons Van De Loo, The Hague (NL)

(73) Assignee: PTT Post Holdings B.V. (NL)

( * ) Notice: Subject to any disclaimer, the term of this patent is extended or adjusted under 35 U.S.C. 154(b) by 0 days.

(21) Appl. No.: 09/322,939

(22) Filed: May 28, 1999

(30) Foreign Application Priority Data

Jun. 3, 1998 (NL) ............................................. 1009304

(51) Int. Cl.$^7$ ............................. G06F 19/00; G06F 7/00
(52) U.S. Cl. ...................... 700/115; 700/116; 700/225; 700/226
(58) Field of Search .................................. 700/112, 115, 700/116, 213, 225, 226

(56) References Cited

U.S. PATENT DOCUMENTS 5,043,908 A * 8/1991 Manduley et al. .......... 700/213
5,051,914 A * 9/1991 Sansone et al. ............. 700/213

* cited by examiner

*Primary Examiner*—Paul P. Gordon
(74) *Attorney, Agent, or Firm*—Michaelson & Wallace; Peter L. Michaelson

(57) ABSTRACT

The invention relates to a method and a system for making up and managing a logistic chain for transporting goods, such as parcels. Such a chain may consist of a combination of collecting, delivery and packing/unpacking actions—elementary activities. The chain-management system breaks down a logistic chain chosen by a principal into the elementary activities required therefor, sees to the supply of orders to a transporter fitting the choice of the principal and indicated by the system, and makes it possible to collect information on the status of execution of the elementary activities.

5 Claims, 2 Drawing Sheets

METHOD AND SYSTEM FOR MAKING UP AND MANAGING A LOGISTIC CHAIN

BACKGROUND OF THE INVENTION

1. Field of the Invention

The invention relates to a method and a system for making up and managing a logistic chain for transporting goods, such as parcels, the logistic chain comprising a combination of several of the following activities, which may be termed elementary:

- collecting at least one item at a collecting location or a sorting location, as the case may be, and subsequently transporting said at least one item to a destination location or a sorting location, as the case may be, where it is delivered;
- at a sorting location, sorting goods by location of the next destination, the elementary activities being carried out on the authority of a principal for said logistic chain.

2. Description of the Prior Art

There was a time when the logistic chain for a traditional postal organisation in the event of parcel services did not imply anything more than what was required to enable an individual mailer to post a parcel at a post office, subsequently to have the postal organisation deliver the parcel, by way of several intermediate stations, to the destination office, and finally to have an employee of said organisation deliver the parcel at the addressee's. Currently, more is expected by customers of "parcel transporters", in particular by business customers. In addition, there are now more parties on the market which render the extension of services imperative; such an extension provides a competitive advantage.

Thus, services have been added, such as:

- a swapping service, a parcel X being transported from location A to location B, and a parcel Y being then transported from location B to location A;
- a packing service, an empty package being transported from depot C to location B, where the package is filled with goods, whereafter the whole is delivered at location A;
- an unpacking service, a package filled with goods being collected at location A and transported to location B, the goods being withdrawn, at location B, from the package and delivered, whereafter the empty package is taken to depot C.

The addition of a packing service and an unpacking service partly is a consequence of the increased care for the environment which has resulted in the desire to recycle packages, which is part of what is sometimes called "reverse logistics". By the way, the term "reverse logistics" denotes collecting and swapping; activities which are the reverse, as it were, of the normal delivery by traditional postal organisations.

These services are based on combinations of collection, whether or not including packing, and delivery, whether or not including unpacking. In addition, said services in a longer logistic chain may be recombined to form, e.g.:

- a swapping service including unpacking and packing;
- a collecting service including unpacking;
- a swapping service including unpacking;
- a swapping service including unpacking, packing and once again unpacking.

Thus, in a logistic chain of a "parcel transporter", many combinations of activities are possible. Stumbling blocks upon introducing such a more extensive service, however, are formed by:

- the complexity for the prospective users: so many choices are possible that there is always something which is easily overlooked;
- the combinations of actions required for handling an order to the transporter must result in orders and addresses for employees of said transporter, for each of the individual actions, which for logistic chains, which must be tailored to each order, results in the need of preparing ever new, unique order forms;
- due to the above, it becoming ever more difficult to trace a parcel in the logistic chain.

SUMMARY OF THE INVENTION

With a method and a system according to the invention, the object is to eliminate the above objections, namely, by offering prospective users the opportunity of choosing from several logistic chains, without them having to make combinations of elementary activities themselves, based on the logistic chain chosen to have a unique order form according to a standard setup manufactured, and by offering opportunities of collecting information in order to determine whether elementary activities have been carried out in time, which facilitates tracing a parcel in the logistic chain. For this purpose, a method according to the invention is characterised in that the logistic chain also comprises the following elementary activities:

- collecting at least one package for an item at a collecting location and then transporting said at least one package to a destination location, where the package is delivered;
- packing at least one item at a collecting location and then transporting the packed at least one item to a destination location, where it is delivered;
- unpacking at least one item at a collecting location and then transporting at least one package to a destination location, where the package is delivered, and that the method comprises the proviso that a principal communicates his choice for a specific logistic chain, in which he wants to transport at least one item, to a chain-management system, and that the chain-management system receives an order from the principal for entering, in a specific logistic chain, the at least one item, whereafter the chain-management system carries out several management steps, comprising:
- the system breaks down said specific logistic chain into the elementary activities required therefor;
- depending on the type of logistic chain indicated by the principal, the system determines the appropriate transporter for the purpose;
- the system provides the specific transporter with the order to carry out elementary actions fitting the logistic chain;
- the system has a form having sticking strips printed out, which form contains information serving to carry out the appropriate elementary actions, such as instructions for drivers in the employment of the specific transporter and addresses of locations, as well as a code unique to said specific logistic chain;
- the system has the form delivered at the location where the logistic chain should begin. According to a first preferred embodiment of the invention, the method is further characterised in that the chain-management system in addition receives return messages from a transporter or from a sorting location on the status of execution of elementary actions.

According to a second preferred embodiment of the invention, the method is further characterised in that the chain-management system determines, based on return messages and on expected times of execution of elementary actions, whether an elementary action has been carried out within a predetermined time window.

According to a third preferred embodiment of the invention, the method is furthermore characterised in that the chain-management system prepares messages, based on return messages, on the status of execution of elementary actions and of possible time excesses, for the benefit of principals.

A system according to the invention is characterised in that the system is a chain-management system comprising:

a central processing unit;

memory means for storing programs and data;

interface circuits for connecting peripheral equipment, such as printers and modems, at least part of the programs being arranged for having carried out several management steps comprising:

the system breaks down a logistic chain into the elementary activities required therefor;

depending on the type of logistic chain indicated by the principal, the system determines the transporter appropriate thereto;

the system provides the specific transporter with the order to carry out elementary actions, fitting the logistic chain;

the system has a form having sticking strips printed out, which form contains information, serving to carry out the appropriate elementary actions, such as instructions for drivers in the employment of the specific transporter and addresses of locations, as well as a code unique to said specific logistic chain;

the system has the form delivered at the location where the logistic chain should begin.

BRIEF DESCRIPTION OF THE DRAWING

The invention will be explained in greater detail by way of a description of an exemplary embodiment, reference being made to a drawing in which.

DESCRIPTION OF AN EXEMPLARY EMBODIMENT

Figure 1:
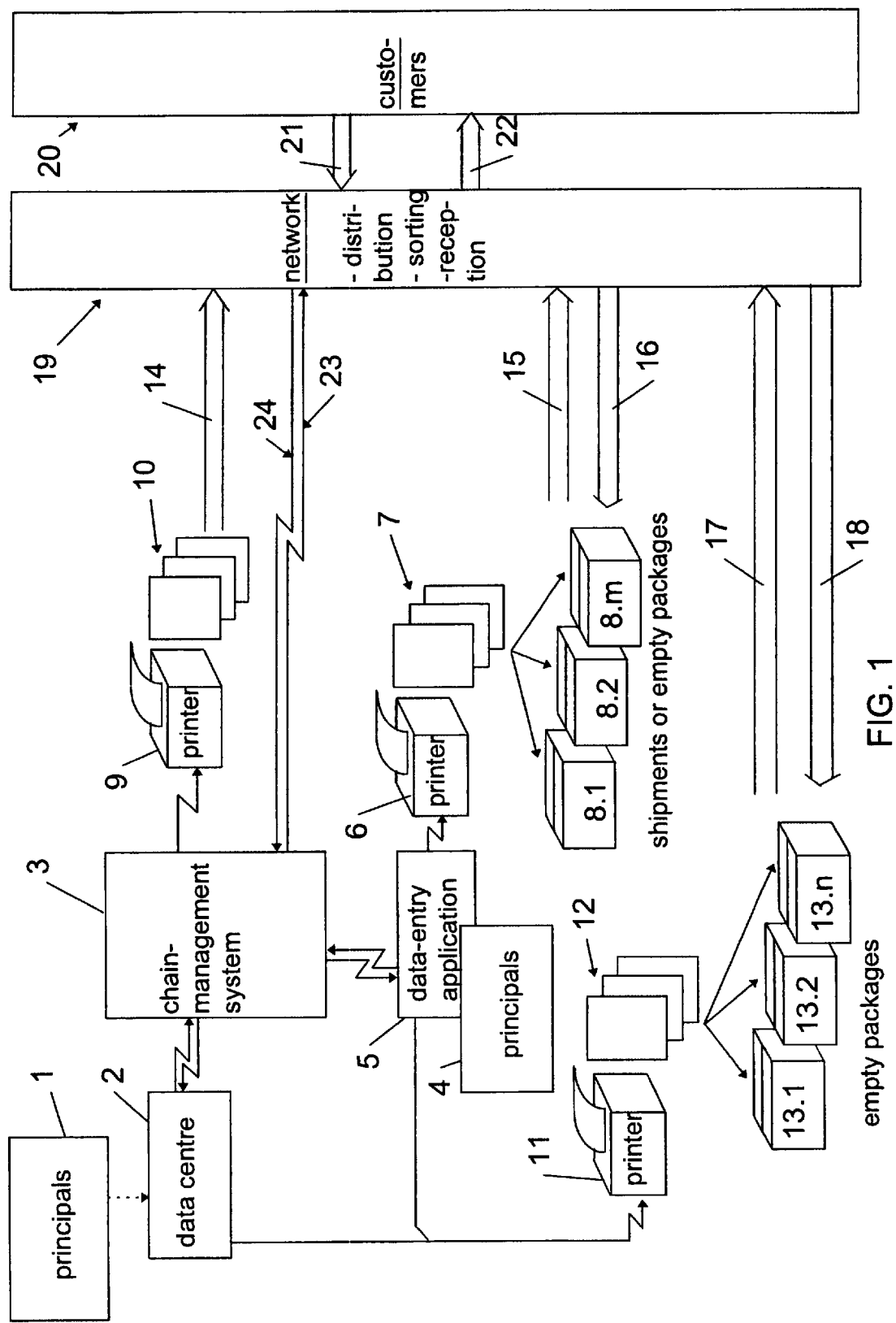
FIG. 1 offers an overview of the position of the chain-management system in the logistic chain, FIG. 2 offers a schematic picture of several logistic services.

The chain-management system according to the invention manages logistic chains in which principals, customers and transporters play a rôle. In this connection, it is the principal who supplies an order to transport a parcel from a customer to a location indicated by the principal or vice versa; a customer himself does not act as a principal. Examples of principals are:

mail-order firms;

suppliers who have a repair service for their clients. In FIG. 1, block (1) designates locations of principals, from where collecting orders are supplied by way of a fax or telephone link; these are processed in data centre (2) and passed on, in the form of a data flow, to the chain-management system (3). Collecting orders, but in addition also swapping, unpacking and packing orders, may be entered into the system by principals (4) by way of a data-entry application (5) to be further described on a computer locally present at the principal's, or at a location of the manager of the logistic chain, and be passed on, in the form of a data flow, to the chain-management system (3). From the data-entry application (5) there may also be driven a printer (6); said printer then prints forms (7) having sticking strips for shipments (8.1 . . . 8.*m*) or for empty packages (8.1 . . . 8.*m*), which are entered as a physical flow (15) into the logistic network (19). The physical flow (15) comprises goods for:

a collecting/packing service (upon entry into the network (19): an empty package);

a swapping service;

a delivery/unpacking service.

The return flow (16) contains goods from:

a collecting/packing service (here, it may concern, e.g., a return shipment to the mail-order firm);

a swapping service;

a delivery/unpacking service (upon arrival from the network (19): an empty package).

From the data centre (2) or data-entry application (5), there may also be driven a printer (11) at a location serving as a depot for empty packages; said printer then prints forms (12) having sticking strips for empty packages (13.1 . . . 13.*n*), which are entered into the logistic network (19) as a physical flow (17). The return flow (18) also comprises empty packages.

Forms having sticking strips (10) for collecting orders are printed by printer (9), driven for this purpose from the chain-management system (3). Said forms constitute a physical flow (14) in the direction of the logistic network (19).

Preliminary messages on orders reach the network (19) from the chain-management system (3) in the form of a data flow (23), while reporting back from the network (19) to the chain-management system (3) in the form of observation data takes place as a data flow (24).

Actions resulting in the physical (goods) flow (21) from customer locations (20) comprise:

collecting, followed by distribution (to principal's locations);

collecting cum packing, followed by distribution;

unpacking, followed by distribution (e.g., returning empty packages);

swapping (per se a combination of delivery and collecting), followed by distribution.

Actions resulting in the physical (goods) flow (22) to customer locations (20) comprise:

delivery;

delivery cum swapping;

delivery cum unpacking;

delivery (of an empty package) cum packing. In the logistic network (19), there are carried out the activities required for the logistic process. This specifically concerns the distribution, the sorting by (intermediate) destination, and the reception of goods.

By way of example, the course of affairs is now described for a swapping order. The principal at location (4) enters the order by way of the data-entry application (5). Said application is a release, adapted for application in the system described, of one of the widely distributed file-management programs, such as MicroSoft Access.

Upon entry of an order, the principal should identify himself; this may take place, e.g., by way of a unique customer code and/or a debtor number. Such for the benefit of invoicing the costs of carrying out the orders, but also to be able to inform the principal on the status of execution of the orders. In addition, the identification may possibly be used to verify whether the principal in question is contractually entitled to issue a specific type of order.

An order may relate to one single parcel (package) or to a shipment consisting of more than one package. In the latter case, a form having sticking strips is printed for each package of a shipment.

After entry into the data-entry application (5), the resulting order data is transmitted to the chain-management system (3) in the form of a data flow. As a first step, said chain-management system attributes a unique identification to the order in the form of a series of characters, designated by "code xxx" in FIG. 3. Meanwhile, if a shipment consists of more than one package, each one thereof is attributed a separate, unique code; henceforward, this will no longer be referred to in the specification. The chain-management system then breaks down the order into several elementary activities. In the event of the swapping action to be described, these are:

reception of a shipment X in the logistic network;

delivery of the shipment X at the location of the customer (action B1);

(preferably at the same time) collecting a shipment Y packed by the customer at the location of the customer, shipment Y comprising the item for which shipment X is the replacement (action A1);

delivery of the shipment Y at a location of the principal or at a location designated by the principal (action B2), including unpacking the shipment;

delivery of the empty package at a central packing depot or at a location of the principal himself (action B3). When breaking down an order into elementary activities, the moments at which activities should be carried out—the monitoring moments—are also determined. Said monitoring moments are derived from the current date known to the system (the entry date of the order), the maximum time interval required for carrying out the activity in question, and a predetermined alarm-delay time. In addition, preliminary messages are prepared for transmitting as a data flow (23) to a network (19).

Figure 3:
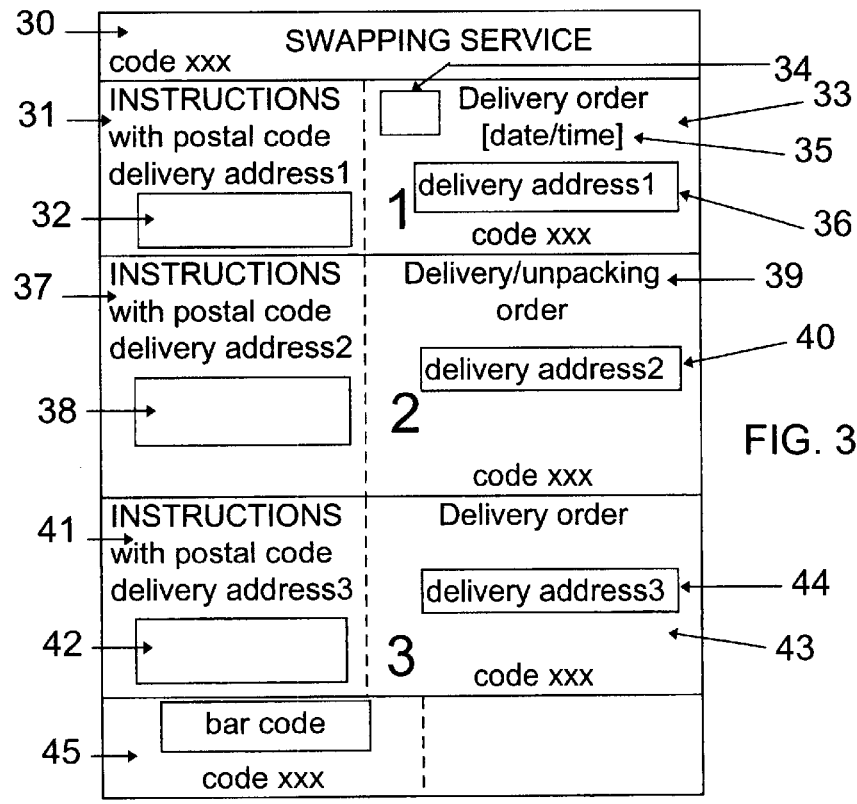
FIG. 3 shows an example of an order form for use in the method according to the invention, relating to a swapping/unpacking service.

For the benefit of actions A1, B1, B2 and B3, the printer (6) prints out a form having sticking strips (7) according to a format of which FIG. 3 shows an example, and whose particulars are offered with the description of said FIG. 3. The method according to the invention provides for it that for each logistic chain consisting of combinations of elementary actions there may be printed a form without paper having to be changed; for each order, all addresses and instructions are entered in advance only once and printed out on the forms in the appropriate order. During the execution of the order, there is no longer added any data to the form. Since there is no need to change paper, forms may also be printed at another location than the one where the data is entered.

The unique code referred to earlier—"code xxx" in FIG. 3—is also printed out on the sticking strips in a machine-readable form, e.g., as a bar code. Said code may then be read using a "hand scanner", as a result of which the chain-management system (3) is capable of receiving information by way of the data flow (24) on the status of execution of the various activities associated with an order. Based on the status data, the chain-management system (3) generates messages to the principals on location and time of execution of the consecutive activities relating to a specific order ("tracking and tracing"); in addition, the system is capable of providing overviews of orders carried out during a specific period, e.g., a month, and associated particulars, such as the number of times that it was not possible to carry out an order in time, with mention of the reasons.

The event of a swapping order as described here offers the advantage, particularly in the form of time gains, to have the required form with sticking strips printed out at the location of the principal, and therefore, e.g., by a printer (6). The principal then provides the shipment X with the appropriate sticking strip, originating from the printed form (7), whereafter he provides for entry in the logistic network (19), part "reception", by way of physical flow (15). Another option is to have forms with sticking strips (10) printed by printer (9), whereafter such forms are entered into the logistic network (19) in a physical flow (14). A shipment x may then be provided, upon entry into the logistic network (19), with the associated form having instructions for further handling.

By way of the logistic network (19), the shipment X is then delivered (action B1) to the customer in question (20), at which occasion the item Y to be replaced is additionally collected from said client (action A1). Here, the instructions on the sticking strips of the form associated with the shipment indicate what is expected from the employee of the transporter (a driver) and from the customer.

Subsequently, the shipment Y is delivered at a location of the principal or at the location indicated by the principal (action B2), while in addition the shipment is unpacked.

Finally, the empty package is delivered to a central packing depot or to a location of the principal himself (action B3).

Figure 2:
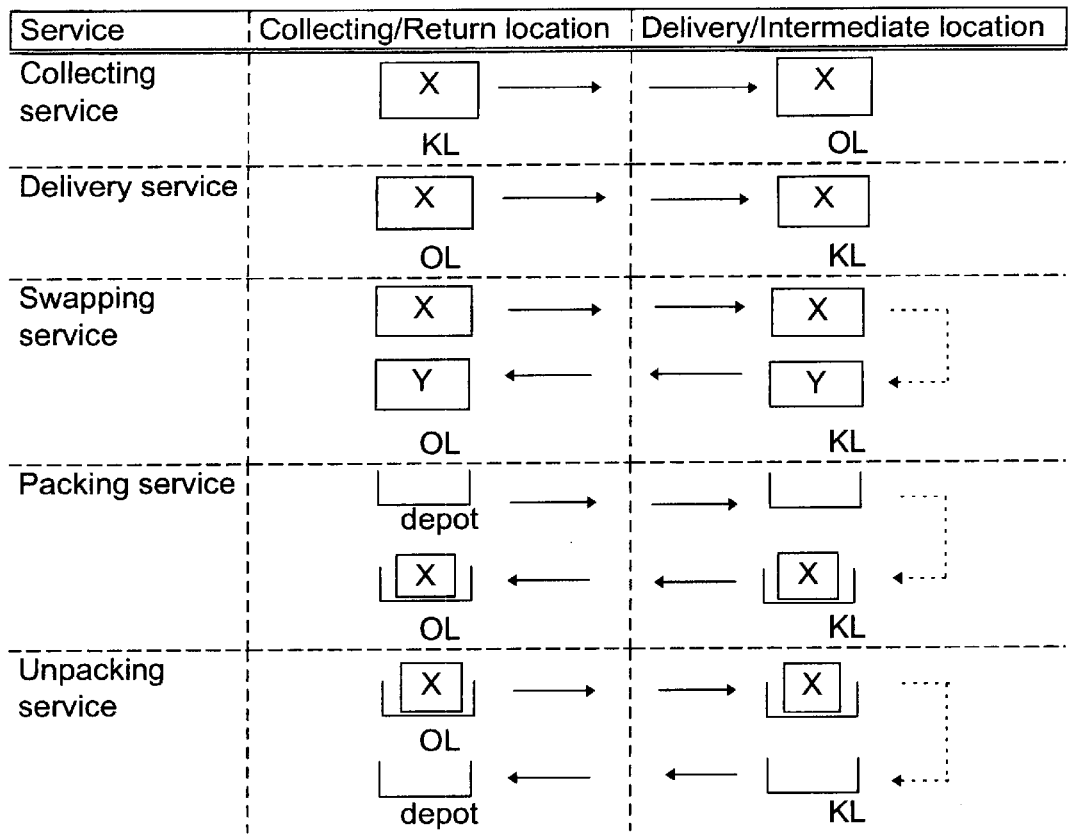

FIG. 2 offers a schematic picture of several logistic services to which the method according to the invention may be applied.

In the event of the "collecting service", a parcel X is collected from a client at his location (KL) and delivered, by way of the network (19), at a location of the principal, or at a location indicated by the principal (henceforward to be indicated by principal's location (OL)).

The "delivery service" implies: collecting a parcel X at a principal's location (OL) and, by way of the network (19), delivering it at the location of the client (KL).

For the sake of carrying out the "swapping service", a parcel X is collected at a principal's location (OL) and delivered at a customer location (KL). Said parcel X contains a replacement for an item Y at the customer's. Said item Y is collected from the client as a parcel at the same occasion as the one on which parcel X is delivered at the client's. Finally, parcel Y is delivered at the principal's location (OL).

The packing service implies: collecting an empty package (a crate or a similar type of packaging material) at a depot for empty packages, and delivering said package at the customer location (KL) in question, packing an item X in the package delivered and delivering the packed shipment X at the principal's location (OL). The depot for empty packages may be a central depot of the transporter or the manager of the logistic network (19), in which empty packages for various principals are stored, or the depot may be located with the associated principal himself.

For the benefit of the unpacking service, a packed shipment X is collected at the principal's location (OL), whereafter the shipment is delivered to a customer location (KL). At the latter location, the shipment is unpacked and the empty package is delivered to the location of the associated depot.

FIG. 3 shows an example of a form having sticking strips, as this may look like for the described swapping/unpacking service. As a first step in the associated logistic process, a shipment is received containing an item which must serve to replace another item located with the customer of the principal. By the way, said reception may take place at a location of the principal at an address which in field (34) is referred to as a collecting address, in which case collecting may indeed be referred to, or at a location of the manager of the logistic network, e.g., at a counter of a shipping office, in which case the reception of a shipment is involved.

The top part (30) of the form is the collecting certificate which is handed over by the driver in question to the sender—in this case the customer of the principal—upon receipt of a shipment. After all, in the framework of a swapping order, the customer of the principal is considered the sender, namely, for the item that is with said customer and must be swapped. For this purpose, the replacement item was previously received by the principal, as has already been explained.

The strip below the collecting certificate (30) (between continuous lines)—address label 1—is the address/instruction strip for the delivery/swapping order; strip part (31) thereof is the instruction portion and strip part (33) the address portion. The strip part (31) contains at least the instruction field (32), which in the present example comprises the following instructions (the parts between brackets do not figure on the form, but are added here for explanatory purposes):

receive shipment [at delivery address 1 of the customer of the principal, also the swapping address, referred to in field (36), while the shipment is the item to be swapped];

deliver shipment [contains the replacement item, delivered at the delivery address 1 in field (36), at the time indicated in field (35)];

have signature placed on distribution list [at the delivery address 1];

stick countersticker on distribution list [the countersticker is the sticking strip (44) at the bottom of the form];

hand over collecting certificate to sender [in this case, the customer of the principal, as proof that an item to be swapped was indeed received by the driver in question];

stick address label 2—"delivery/unpacking order"—to shipment.

In addition to the address fields (34) and (36) and date/time field (35), strip part (33) also contains the code "code xxx", which is unique to the shipment in question, where xxx stands for a series of characters and a representation thereof in machine-readable form, e.g., as a bar code.

The strip parts (37) and (39), together constituting address label 2, respectively contain the instructions and the address for the delivery/unpacking order; this results in the shipment, which was received at delivery address 1 in replacement of the shipment received at the principal's or at the counter of a shipping office, arriving at the principal's at the address already referred to in field (34), included in field (40) as delivery address 2. In this example, the instruction field (38) in address label 2 contains the following instructions:

unpack shipment [here, it concerns the item returned by the customer to the principal, for which the customer received a replacement item in the preceding action];

have signature placed on distribution list [at delivery address 2];

stick address label 3—"delivery order"—onto shipment [on the now empty package].

The strip parts (41) and (43), together forming address label 3, respectively contain the instructions and the address for the delivery order relating to the (empty) package. The delivery address 3 referred to in field (44) is the address where said package must be delivered. This may be a central packing depot for several principals, or a location of the principal himself. In this example, the instruction field (42) on address label 3 contains only one instruction to the driver, to wit:

deliver shipment. The bottom part of the form—strip (45)—is the countersticker to which instruction field (32) refers.

What is claimed is:

1. A method for making up and managing a logistic chain for transporting goods, such as parcels, the logistic chain comprising a combination of several of the following activities to be described as elementary:

collecting at least one item at a collecting location or a sorting location and then transporting said at least one item to a destination location or a sorting location where said one item is delivered; and at a sorting location, sorting goods by location of the next destination;

the elementary activities being carried out on authority of a principal for said logistic chain, the logistic chain additionally comprising the following elementary activities:

collecting at least one package for an item at a collecting location and then transporting said at least one package to a destination location, where the package is delivered;

packing at least one item at a collecting location and then transporting the packed at least one item to a destination location, where said packed at least one item is delivered; and unpacking at least one item at a collecting location and then transporting the at least one package to a destination location, where the package is delivered, the method comprising a proviso that a principal communicates his choice for a specific logistic chain, in which the principal wants to have transported at least one item, to a chain-management system, and that the chain-management system receives an order from the principal for entering, into a specific logistic chain, at least one item, whereafter the chain-management system carries out several management steps, comprising:

the system breaking down this specific logistic chain into the elementary activities required therefor;

depending on a type of logistic chain indicated by the principal, the system determining the transporter appropriate thereto;

the system providing the specific transporter with the order to carry out elementary actions fitting the logistic chain;

the system having a form with sticking strips printed, which form contains information serving to carry out the fitting elementary actions as well as a code unique to said specific logistic chain; and the system having the form delivered at the location where the logistic chain should begin.

2. The method according to claim 1 wherein the chain-management system further performs the step of additionally receiving return messages from a transporter or from a sorting location, on status of execution of elementary actions.

3. The method according to claim 2 wherein the chain-management system further performs the step of determining, in response to return messages and expected times of execution of elementary actions, whether an elementary action has been carried out within a predetermined time window.

4. The method according to claim 3 wherein the chain-management system further performs the step of preparing messages in response to return messages, on the status of execution of elementary actions and of possible time excesses.

5. A system for application in the method according to claim 1, comprising:
- a central processing unit;
- memory means for storing programs and data; and
- interface circuits for connecting peripheral equipment;

the system being a chain-management system, wherein part of the programs are arranged to carry out several management steps, comprising:
- the system breaking down a logistic chain into elementary activities required therefor;
- depending on a type of logistic chain indicated by a principal, the system determining a transporter appropriate thereto;
- the system providing the transporter with order to carry out elementary actions fitting the logistic chain;
- the system having a form with sticking strips printed, which form contains information serving to carry out the fitting elementary actions as well as a code unique to said specific logistic chain; and
- the system having the form delivered at a location where the logistic chain should begin.

* * * * *